(12) United States Patent
Pirozzi et al.

(10) Patent No.: US 8,020,033 B2
(45) Date of Patent: Sep. 13, 2011

(54) LOGICAL ENTITY FAULT ISOLATION IN NETWORK SYSTEMS MANAGEMENT

(75) Inventors: Timothy J. Pirozzi, Rochester, NH (US); Christopher Burke, Greenland, NH (US)

(73) Assignee: Computer Associates Think, Inc., Islandia, NY (US)

( * ) Notice: Subject to any disclaimer, the term of this patent is extended or adjusted under 35 U.S.C. 154(b) by 290 days.

(21) Appl. No.: 12/472,693

(22) Filed: May 27, 2009

(65) Prior Publication Data

US 2010/0306594 A1    Dec. 2, 2010

(51) Int. Cl.
*G06F 11/00* (2006.01)
(52) U.S. Cl. .................................. 714/4.1
(58) Field of Classification Search .......... 714/4.1
See application file for complete search history.

(56) References Cited

U.S. PATENT DOCUMENTS

| 7,197,561 B1 * | 3/2007 | Lovy et al. | 709/224 |
| 7,693,976 B2 * | 4/2010 | Perry et al. | 709/223 |
| 2009/0299984 A1 * | 12/2009 | Dettinger et al. | 707/3 |
| 2010/0322086 A1 * | 12/2010 | Harris et al. | 370/252 |

* cited by examiner

*Primary Examiner* — Bryce P Bonzo
(74) *Attorney, Agent, or Firm* — Schwegman, Lundberg & Woessner, P.A.

(57) ABSTRACT

Various embodiments include one or more of systems, methods, and software to provide a status of a logical entity between entity models in network management systems, such as for fault isolation, in an efficient manner. Some embodiments, when receiving requests for a status of a logical entity while already in the process of determining the status in response to a previously received request, include adding an identifier of the subsequent requestor to a status requestor list and not responding to or taking any further action with regard to the request from the subsequent requestor until the status in response to the first received status request is determined.

20 Claims, 4 Drawing Sheets

LOGICAL ENTITY FAULT ISOLATION IN NETWORK SYSTEMS MANAGEMENT

BACKGROUND INFORMATION

Fault isolation in network management systems is a difficult and often inefficient task. Fault isolation attempts to identify networked system entities that are not operational, or "down," and are a root cause of a potential larger networked system outage. As used herein, an entity is a device, process, or other resource in a networked system that is under management of, or otherwise tracked or modeled by, a network management system. Some entities that are tracked or modeled may be entities that the network management system is unable to directly obtain operational status information from, such as network cable links as opposed to network interconnection devices such as routers. Other examples of an entity that the network management system is unable to directly obtain operational status information from may include servers, processes, and hardware maintained by external organizations and "dumb" devices that have limited or no Simple Network Management Protocol (SNMP) communication capabilities. Such an entity is referred to herein as a "logical entity." An entity that a network management system is able to directly obtain operational status information from is referred to as a "physical entity."

Network management systems typically maintain a model of the logical entity that includes a last known operational status of the logical entity. The operational status of the logical entity is inferred through the operational status of physical entities that neighbor the logical entity within a larger networked system topology. Each physical entity also includes a model in the network management system that maintains an operational status of the respective physical entity. Through the status of the neighboring physical entities as represented in the physical entity models, a status of the logical entity may be inferred. For example, if all of the neighboring physical entities of the logical entity have a status of "up," the logical entity may be inferred to have a status of "up." Conversely, if all or a majority of the neighboring physical entities have a status of "down," the logical entity may be inferred to have a status of "down." However, in an instance where all of the neighboring physical entities have a status of "up," but a fault is detected with regard to the logical entity, the status of the logical entity may be "down" and an inference may be drawn that the logical entity is the root cause of the fault.

The difficulties and inefficiencies in fault isolation by network management systems arise in instances such as when the network management system detects that it has lost contact with a logical entity. For example, upon detection of a fault with regard to a logical entity, the network management system will trigger a fault isolation process to identify the status of physical entities and infer the status of logical entities. In such a process, the network management system will send messages from the logical entity model for which the fault was detected to the models of its neighboring entities. The models of the neighboring entities will receive their respective message, check their own status, such as by querying a physical device represented by a physical entity model, and if up, the entity then sends a message to its neighbors inquiring about their status. In such instances, the neighbors of the physical entity model including the logical entity model for which the fault was detected, often receive a second message inquiring about their status. As a result, the status inquiry messages that originate with the logical entity model may end up being repeated many, many times. This creates excessive inter-model processing within the network management system which consumes processing resources. Further, when physical entity models perform a status query of their respective physical entities, considerable traffic may flood the organizational network. As a networked system is scaled up, such fault isolation techniques become more and more resource intensive increasing latency within networked systems and network managements systems.

SUMMARY

Various embodiments include one or more of systems, methods, and software to provide a status of a logical entity between entity models in network management systems, such as for fault isolation, in an efficient manner. Some embodiments, when receiving requests for a status of a logical entity while already in the process of determining the status in response to a previously received request, include adding an identifier of the subsequent requestor to a status requestor list and not responding to or taking any further action with regard to the request from the subsequent requester until the status in response to the first received status request is determined.

DETAILED DESCRIPTION

Various embodiments herein include one or more of systems, methods, and software to provide a status of a logical entity between entity models in network management systems, such as for fault isolation, in an efficient manner. Efficiency in some embodiments is obtained through elimination of redundant processing and communication between logical and physical entity models, such as by not sending status requests or responses from logical entity models when a previously received status request is still pending. Once the status for a previously received status request is determined in such embodiments, all pending status requests that have been received by the logical entity model are responded to. These and other embodiments are described below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices.

Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Figure 1:
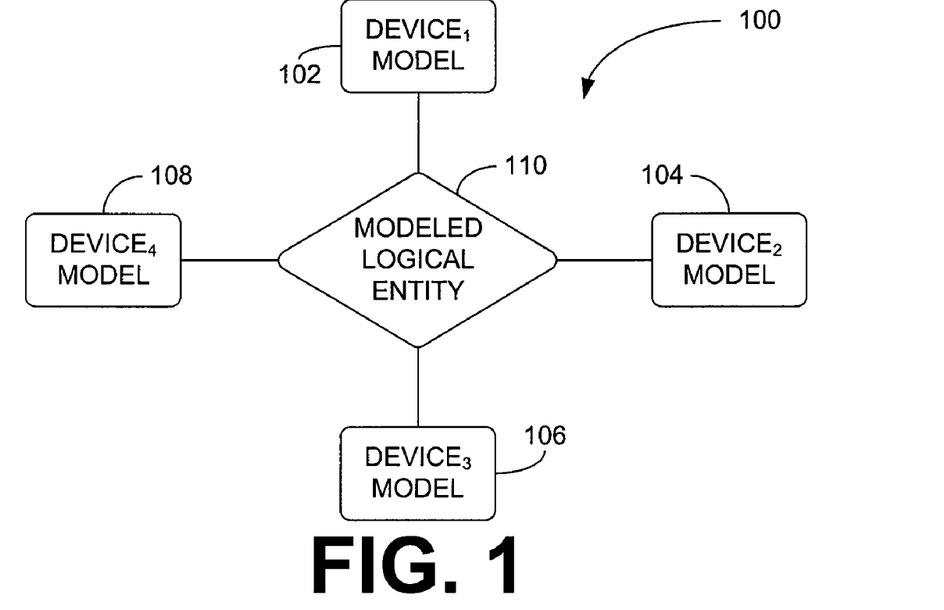
FIG. 1 is a block diagram of a networked system topology according to an example embodiment.

FIG. 1 is a block diagram of a networked system topology according to an example embodiment. The illustrated networked system topology is an example model 100 including device models$_{1-4}$ 102, 104, 106, 108 that neighbor a modeled logical entity 110. The lines connecting the device models$_{1-4}$ 102, 104, 106, 108 to the modeled logical entity 110 represent interconnections, such as network connections. Such network connections may be over one or more network types such as wired or wireless local area networks, system area networks, wide area networks, the Internet, and the like. The model 100 is provided as a simple example of a model and may include many more device and logical entity models depending on the makeup of the networked system the model 100 represents.

The device models$_{1-4}$ 102, 104, 106, 108 model and represent physical entities included within the networked system topology. Such physical entities may include routers, hubs, server machines, and other devices. Such physical entities are typically capable of receiving and responding to status requests, which may also be referred to as status queries, from their respective device models. Such status requests may be made in accordance with the Simple Network Management Protocol (SNMP), another standards based protocol, a proprietary protocol of a network management system, or other protocol.

The modeled logical entity 110 models and represents a networked system element that status requests may not be sent to. For example, a network link or a device or process maintained by another organization that may be in communication with one or more physical entities of the networked system that may be represented by a device model. In such an instance, the modeled logical entity 110 model may include a rule to apply to status data of neighboring entities of the modeled logical entity 110 to infer a status. Such a rule may declare that if more than 40 percent of neighboring entities are down, the status of the logical entity maintained in the logical entity model 110 will be down. Each of the models, device and logical, may include such rules and these rules are typically evaluated in view of status of the underlying entity when performing root cause analysis to isolate faults in networked systems. The goal of fault isolation is typically to distinguish between symptoms of a fault and a cause of a fault. For example, if contact is lost with the logical entity represented by the modeled logical entity 110, but each of the device models$_{1-4}$ 102, 104, 106, 108 are down, the loss of contact is more likely a symptom than the root cause. Conversely, if contact with the logical entity represented by the modeled logical entity 110 is lost, but each of the device models$_{1-4}$ 102, 104, 106, 108 have a status of up, the root cause may be isolated to be with the modeled logical entity 110.

Figure 2:
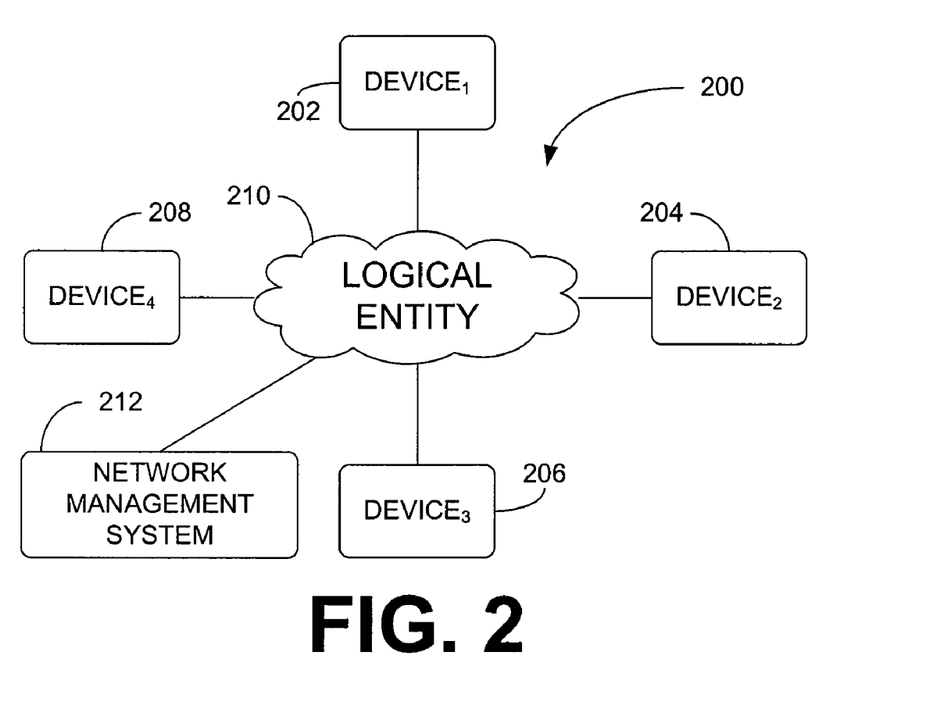
FIG. 2 is a block diagram of a networked system according to an example embodiment.

FIG. 2 is a block diagram of a networked system 200 according to an example embodiment. The networked system 200 is an example of the networked system model 100 of FIG. 1. The networked system include a device$_1$ 202, device$_2$ 204, device$_3$ 206, and device$_4$ 208 which are respectively modeled in the model 100 of FIG. 1 by device model$_1$ 102, device model$_2$ 104, device model$_3$ 106, and device model$_4$ 108. The devices 202, 204, 206, 208 may be the same type or differing types of devices. Such devices 202, 204, 206, 208 may include one or more of routers, hubs, servers, processes or applications that execute on servers or other computing devices, or other devices capable of receiving and responding to status requests received from a network management system 212.

The networked system 200 also includes a logical entity 210. In the illustrated embodiment of the networked system 200, the logical entity 210 is a network managed by another entity, without direct management by the network management system 212. Such as network may, for example, be the Internet.

The model 100 of FIG. 1 exists in the network management system 212. The model 100 may be stored in a database or other storage device accessible to the network management system 212. In operation, the network management system 212 typically causes each of the device models$_{1-4}$ 102, 104, 106, 108 to submit status requests to their respective devices$_{1-4}$ 202, 204, 206, 208. The status is maintained in the device models$_{1-4}$ 102, 104, 106, 108 and updated periodically, upon occurrence of an event, as directed by a human or logical user or administrator, or at other times depending on the particular embodiment. The status of the logical entity 210 may be determined by the network management system 212 at the same time though use of the modeled logical entity 110. However, when determining the status of the logical entity 210 at the same time as the devices$_{1-4}$ 202, 204, 206, 208, the inefficiencies discussed above are likely to arise. Thus, the network management system 212 implements one or more of the various methods herein, such as are illustrated and described with regard to FIG. 3 and FIG. 4.

Figure 3:
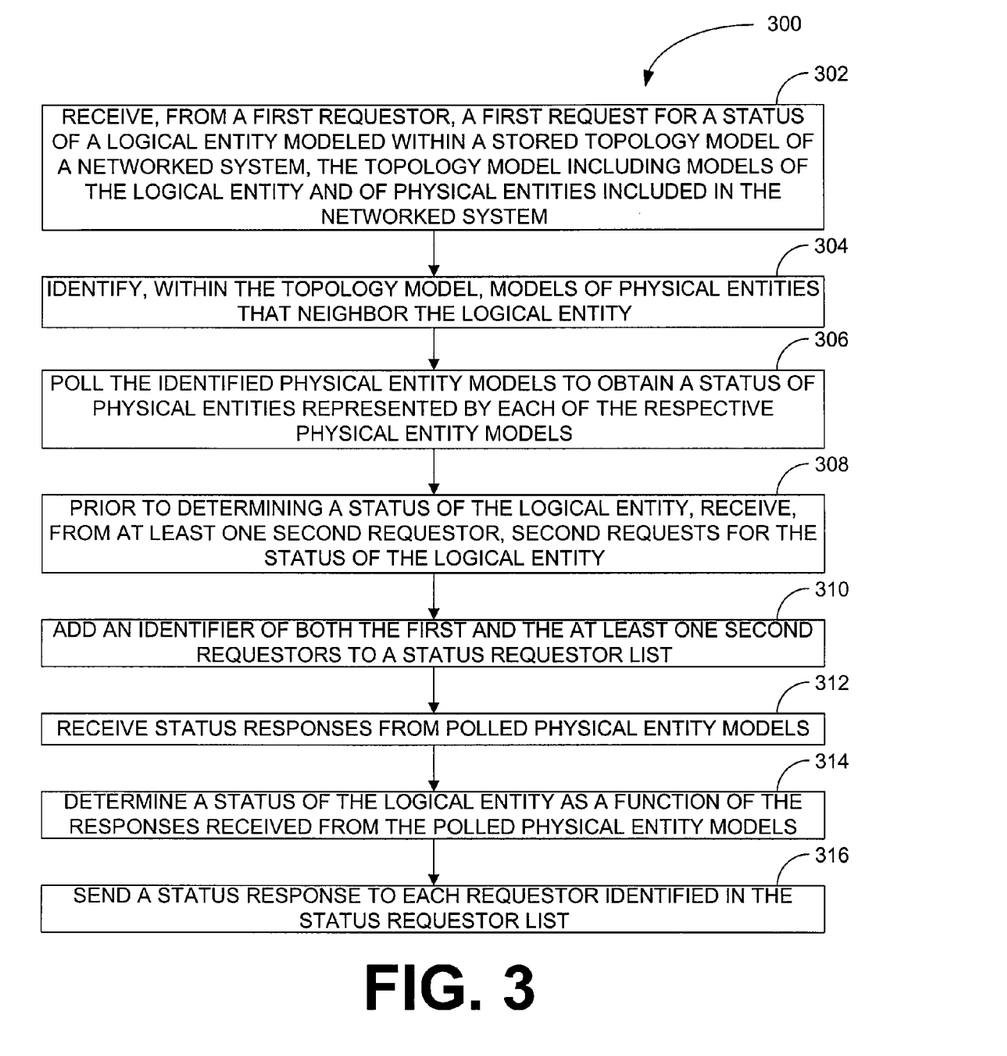
FIG. 3 is a block flow diagram of a method according to an example embodiment.

FIG. 3 is a block flow diagram of a method 300 according to an example embodiment. The method 300 is an example of a method that may be performed by the network management system 212 of FIG. 2 to determine a status of the logical entity 210 and maintain that status in the networked system 200 model 100 of FIG. 1. Returning to FIG. 3, the method 300 includes receiving 302, from a first requestor, a first request for a status of a logical entity modeled within a stored topology model of a networked system. The topology model, in some such embodiments, includes models of the logical entity and of physical entities included in the networked system. The first requestor the status request is received 302 from is typically a process within a network management system. The first request may be received 302 from such a process on a scheduled periodic basis, upon occurrence of a fault in a networked system under management, or at another time depending on the particular embodiment.

After the status request for the logical entity is received 302, the method 300 includes identifying 304 models of physical entities that neighbor the logical entity. Physical entities that neighbor the logical entity may be identified by modeled links there between, such as are represented by the lines in FIG. 1 that connect the modeled logical entity 110 to the device models 102, 104, 106, 108.

Once the neighboring physical entities of the logical entity are identified, the method 300 may the poll 306 the identified physical entity models to obtain a status of physical entities represented by each of the respective physical entity models. At this point in the processing of the received 302 status request, the risk of processing and communication inefficiencies is great. When further logical entity status requests are received, processing the request may cause polling 306 of the same identified physical entity models before they have an opportunity to respond to the initial polling. Further, the physical entity models often will poll their respective physical entities, such as devices, over a network to obtain an up-to-date status. As result, status requests may consume excessive computing resources of a network management system implementing the method 300 as well as excessive physical entity processing resources and network bandwidth.

Such inefficiencies are avoided in various embodiments in differing manners. For example, in method 300, prior to determining 314 a status of the logical entity, the method 300 includes receiving 308, from at least one second requester, second requests for the status of the logical entity and adding 310 an identifier of both the first and the at least one second requesters to a status requestor list. The second request and other subsequently received requests are then ignored until the status of the logical entity has been determined 314. The method 30 thus continues by receiving 312 status responses from polled physical entity models and determining 314 a status of the logical entity as a function of the responses received from the polled physical entity models. At this point the method 300 then sends 316 a status response to each requestor identified in the status requester list. The status requestor list is then purged. As a result, the status of the logical entity is determined 314 only once but reported multiple times to each status requestor thereby reducing processing overhead within the network management system and at the physical entities as well as reducing network traffic.

In some embodiments of the method 300, determining 314 the status of the logical entity as a function of the responses received 312 from the polled physical entity models includes applying a rule included in the logical entity model to the status responses of the polled physical entity models. Application of such a rule typical results in an indicator of the status of the logical entity represented by the logical entity model. Such a rule may identify a percentage of operative physical entities and when the percentage is not met, the logical entity is determined to have a non-operative status.

Figure 4:
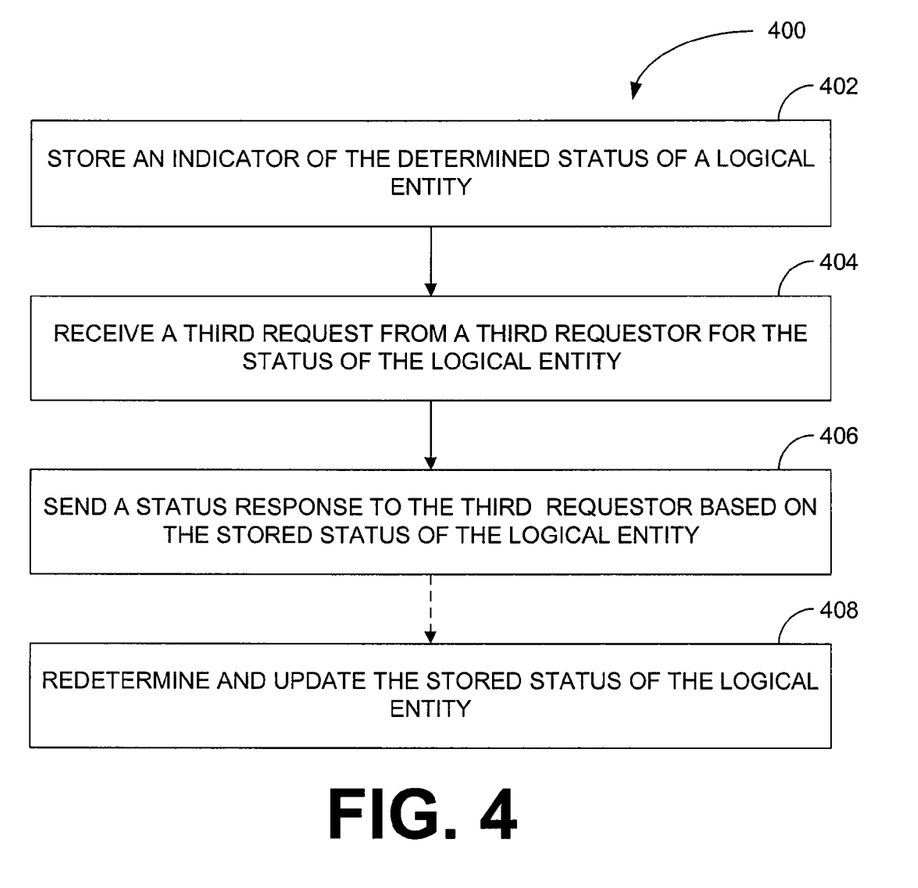
FIG. 4 is a block flow diagram of a method according to an example embodiment.

FIG. 4 is a block flow diagram of another method 400 according to an example embodiment. The method 400 is typically performed after the status of the logical entity has been determined, such as through performance of the method 300 of FIG. 3. The method 400 of FIG. 4 includes storing 402 an indicator of the determined status of the logical entity. The method 400, described as an extension of the method 300 of FIG. 3, further includes receiving 404 a third request from a third requestor for the status of the logical entity and sending a status response to the third requestor based on the stored status of the logical entity. This stored status that is sent to the third requester may be the determined 314 status from the method 300.

In some embodiments of the method 400, receipt of the third status request for the status of the logical entity may also trigger re-determining 408 of the logical entity status. The re-determining may include performing portions of the method 300, such as polling 306 the identified physical entity models to obtain a status of physical entities represented by each of the respective physical entity models and receiving 312 status responses from polled physical entity models. The status of the logical entity may then be re-determined and the stored indicator of the determined status may be updated. In some instance, a fourth request for the status of the logical entity may be received while the re-determining 408 is in process. In such instances, the method 400 may include sending a status response to the fourth requestor with the stored 402 status. In other embodiments, the fourth requestor may be added to a status requestor list and upon update of the stored status indicator, all requesters included in the status requester list are responded to.

In some embodiments of both the method 300 of FIG. 3 and the method 400 of FIG. 4, status requests may be received from a monitor module, or other process, of a network management system that actively monitors status of entities, both logical and physical, with a networked system under management. In some such embodiments, entity models, upon detection of one or more of a fault, a possible fault, or other change in status of the logical or physical entity represented by the model may send a message or other communication to the monitor module or a neighboring entity model. Thus, the methods 300 and 400 may be triggered for execution in various ways, depending on the particular embodiment. Further, the determined status may be reported to or retrieved by fault isolation processes and modules that may be included within a network management system for further processing to isolate faults, identify root causes of faults, monitoring conformance with performance indicators and requirements, and for other purposes depending on the particular embodiment.

Figure 5:
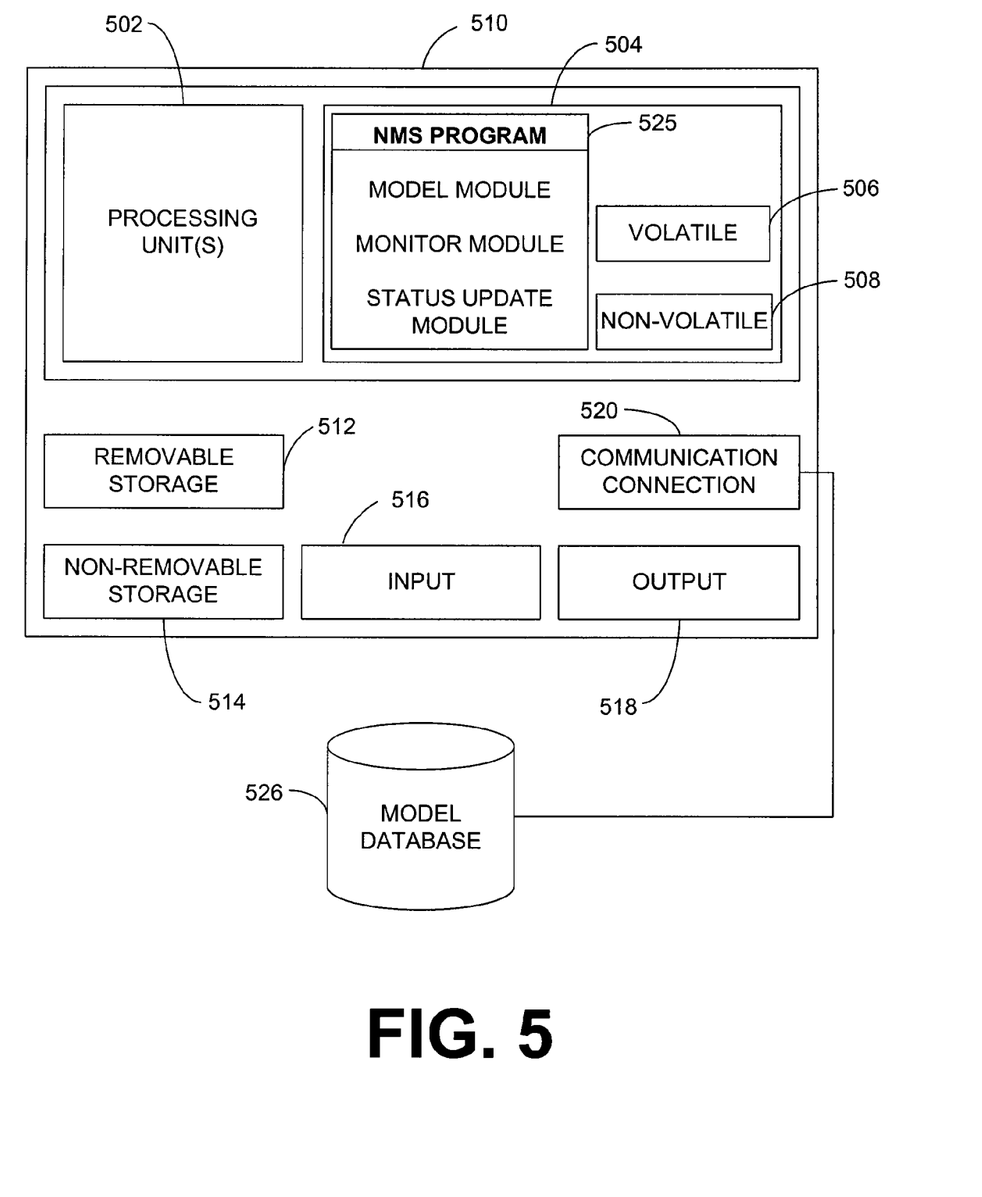
FIG. 5 is a block diagram of a computing device according to an example embodiment.

FIG. 5 is a block diagram of a computing device according to an example embodiment. The computing device is an example of a computing device upon which a network management system program 525 may execute. In one embodiment, multiple such computer systems are utilized in a distributed network to implement multiple components in a transaction based environment. An object oriented, service oriented, or other architecture may be used to implement such functions and communicate between the multiple systems and components. One example computing device in the form of a computer 510, may include one or more processing units 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512, and non-removable storage 514. Computer storage includes random access memory (RAM), read only memory (ROM), erasable programmable read-only memory (EPROM) & electrically erasable programmable read-only memory (EEPROM), flash memory, or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer 510 operate in a networked environment, such as is illustrated in FIG. 2, using a communication connection to connect to one or more remote computers and devices, or as otherwise described as physical entities. The communication connection may include a Local Area Network (LAN), a Wide Area Network (WAN), a System Area Network (SAN), the Internet, or other networks. The communication connection may include a connection to such network types using at least one of a wired or wireless network interface device.

Computer-readable instructions stored on a computer-readable medium are executable by the one or more processing units 502 of the computer 510. A hard drive, CD-ROM, and RAM are some examples of articles including a computer-readable medium. For example, the network management system program 525 may be included on a CD-ROM, in the memory 504, or other memory or storage device. The computer-readable instructions allow computer 510 to perform one or more of the methods described herein and may include further instructions to cause the computer 510 to provide network management system functionality.

In some embodiments, models of a networked system topology, such as model 100 of FIG. 1, may be stored in one or more of the non-removable storage 514, removable storage 512, or memory 504. The models may be stored as flat files, in a database under management of a database management system, as objects or other data elements under control of the network management system program 525, or in another manner depending on the embodiment. In some embodiment, models of a networked system topology may be stored in a model database 526 stored locally to the computer 510 or remotely. When stored remotely, the model database 526 is accessible to the network management system program 525 over the communication connection 520.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, from a first requestor, a first request for a status of a logical entity modeled within a stored topology model of a networked system, the topology model including models of the logical entity and of physical entities included in the networked system;
   identifying models of physical entities that neighbor the logical entity;
   polling the identified physical entity models to obtain a status of physical entities represented by each of the respective physical entity models;
   prior to determining a status of the logical entity, receiving, from at least one second requestor, second requests for the status of the logical entity;
   adding an identifier of both the first and the at least one second requesters to a status requestor list;
   receiving status responses from polled physical entity models;
   determining a status of the logical entity as a function of the responses received from the polled physical entity models; and
   sending a status response to each requestor identified in the status requestor list.

2. The method of claim 1, wherein determining the status of the logical entity as a function of the responses received from the polled physical entity models includes:
   applying a rule included in the logical entity model to the status responses of the polled physical entity models to obtain an indicator of the status of the logical entity represented by the logical entity model.

3. The method of claim 2, wherein the rule included in the logical entity model identifies a percentage of operative physical entities and when the percentage is not met, the logical entity is determined to have a non-operative status.

4. The method of claim 1, further comprising:
   storing an indicator of the determined status of the logical entity; and
   upon receipt of a third request from a third requester for the status of the logical entity, sending a status response to the third requester based on the stored status of the logical entity.

5. The method of claim 4, further upon receipt of the third request for the status of the logical entity:
   polling the identified physical entity models to obtain a status of physical entities represented by each of the respective physical entity models;
   prior to determining the status of the logical entity, receiving, from at least one fourth requester, fourth requests for the status of the logical entity;
   receiving status responses from polled physical entity models;
   determining a status of the logical entity as a function of the responses received from the polled physical entity models;
   updating the stored indicator of the determined status of the logical entity.

6. The method of claim 5, wherein upon receipt of the at least one fourth request, sending a status response to the at least one fourth requestors based on the stored status of the logical entity.

7. The method of claim 5, further comprising:
   upon receipt of the at least one fourth requests for a status of the logical entity, adding an identifier the at least one fourth requesters to a status requestor list; and
   upon updating the stored indicator of the determined status of the logical entity, sending a status response to each requestor identified in the status requestor list based on the updated stored status of the logical entity.

8. The method of claim 1, wherein at least one physical entity is a router within the networked system.

9. A computer-readable storage medium, with instructions stored thereon, the execution of which by at least on processor of a computing device, causes the computing device to:
   receive, from a first requester, a first request for a status of a logical entity modeled within a stored topology model of a networked system, the topology model including models of the logical entity and of physical entities included in the networked system;
   identify, within the topology model, models of physical entities that neighbor the logical entity;
   poll the identified physical entity models to obtain a status of physical entities represented by each of the respective physical entity models;
   prior to determining a status of the logical entity, receive, from at least one second requestor, second requests for the status of the logical entity;
   add an identifier of both the first and the at least one second requestors to a status requestor list;
   receive status responses from polled physical entity models;
   determine a status of the logical entity as a function of the responses received from the polled physical entity models; and
   send a status response to each requestor identified in the status requestor list.

10. The computer-readable storage medium of claim 9, wherein determining the status of the logical entity as a function of the responses received from the polled physical entity models includes:
    applying a rule included in the logical entity model to the status responses of the polled physical entity models to obtain an indicator of the status of the logical entity represented by the logical entity model.

11. The computer-readable storage medium of claim 10, wherein the rule included in the logical entity model identifies a percentage of operative physical entities and when the percentage is not met, the logical entity is determined to have a non-operative status.

12. The computer-readable storage medium of claim 9 including further instructions stored thereon, the execution of which causes the computing device to:
    store an indicator of the determined status of the logical entity; and upon receipt of a third request from a third requestor for the status of the logical entity, send a status response to the third requestor based on the stored status of the logical entity.

13. The computer-readable storage medium of claim 12 including further instructions stored thereon, the execution of which causes the computing device to:
poll the identified physical entity models to obtain a status of physical entities represented by each of the respective physical entity models;
prior to determining the status of the logical entity, receive, from at least one fourth requestor, fourth requests for the status of the logical entity;
receive status responses from polled physical entity models;
determine a status of the logical entity as a function of the responses received from the polled physical entity models;
update the stored indicator of the determined status of the logical entity.

14. The system of claim 13, wherein upon receipt of the at least one fourth requests, sending a status response to the at least one fourth requesters based on the stored status of the logical entity.

15. The computer-readable storage medium of claim 13, wherein upon receipt of the at least one fourth requests, sending a status response to the at least one fourth requestors based on the stored status of the logical entity.

16. The computer-readable storage medium of claim 13 including further instructions stored thereon, the execution of which causes the computing device to:
upon receipt of the at least one fourth requests for a status of the logical entity, add an identifier the at least one fourth requestors to a status requestor list; and
upon updating the stored indicator of the determined status of the logical entity, send a status response to each requestor identified in the status requestor list based on the updated stored status of the logical entity.

17. A system comprising:
at least one processor, at least one memory device, and at least one network interface device operatively coupled;
a network management system, held in the at least one memory device and executable by the at least one processor to:
receive, from a first requestor, a first request for a status of a logical entity modeled within the network management system, the network management system storing, in the at least one memory device, a topology model of a networked system, the topology model including models of the logical entity and of physical entities included in the networked system;
identify, within the topology model, models of physical entities that neighbor the logical entity;
poll the identified physical entity models to obtain a status of physical entities represented by each of the respective physical entity models, wherein a physical entity model, upon receipt of a status polling, requests, over the network interface device, a status from the respective physical entity the physical entity represents;
prior to determining a status of the logical entity, receive, from at least one second requestor, second requests for the status of the logical entity;
add an identifier of both the first and the at least one second requestors to a status requestor list;
receive status responses from polled physical entity models;
determine a status of the logical entity as a function of the responses received from the polled physical entity models; and
send a status response to each requester identified in the status requestor list.

18. The system of claim 17, wherein determining the status of the logical entity includes applying a rule retrieved from the logical entity model to the status responses of the polled physical entity models to obtain an indicator of the status of the logical entity represented by the logical entity model.

19. The system of claim 17, wherein the network management system is further executable by the at least one processor to:
store, in the at least one memory device, an indicator of the determined status of the logical entity; and
upon receipt of a third request from a third requestor for the status of the logical entity, send a status response to the third requestor based on the stored status of the logical entity.

20. The system of claim 19, wherein the network management system is further executable by the at least one processor to:
poll the identified physical entity models to obtain a status of physical entities represented by each of the respective physical entity models;
prior to determining the status of the logical entity, receive, from at least one fourth requester, fourth requests for the status of the logical entity;
receive status responses from polled physical entity models;
determine a status of the logical entity as a function of the responses received from the polled physical entity models;
update, in the at least one memory device, the stored indicator of the determined status of the logical entity.

* * * * *

UNITED STATES PATENT AND TRADEMARK OFFICE
CERTIFICATE OF CORRECTION

| | | |
|---|---|---|
| PATENT NO. | : 8,020,033 B2 | Page 1 of 1 |
| APPLICATION NO. | : 12/472693 | |
| DATED | : September 13, 2011 | |
| INVENTOR(S) | : Timothy J. Pirozzi et al. | |

It is certified that error appears in the above-identified patent and that said Letters Patent is hereby corrected as shown below:

In column 7, line 37, in Claim 1, delete "requesters" and insert -- requestors --, therefor.

In column 7, line 59, in Claim 4, delete "requester" and insert -- requestor --, therefor.

In column 7, line 61, in Claim 4, delete "requester" and insert -- requestor --, therefor.

In column 8, line 2, in Claim 5, delete "requester," and insert -- requestor, --, therefor.

In column 8, line 18, in Claim 7, delete "requesters" and insert -- requestors --, therefor.

In column 8, line 28, in Claim 9, delete "requester," and insert -- requestor, --, therefor.

In column 9, line 12, in Claim 13, delete "requester," and insert -- requestor, --, therefor.

In column 9, line 24, in Claim 14, delete "requesters" and insert -- requestors --, therefor.

In column 9, line 46, in Claim 17, delete "requester," and insert -- requestor, --, therefor.

In column 10, line 20, in Claim 17, delete "requester" and insert -- requestor --, therefor.

In column 10, line 43, in Claim 20, delete "requester," and insert -- requestor, --, therefor.

Signed and Sealed this
Seventeenth Day of January, 2012

David J. Kappos
*Director of the United States Patent and Trademark Office*